United States Patent
Lv et al.

(10) Patent No.: US 11,750,698 B2
(45) Date of Patent: *Sep. 5, 2023

(54) NETWORK DEVICE SYNCHRONIZATION METHOD AND NETWORK DEVICE

(71) Applicant: HUAWEI TECHNOLOGIES CO., LTD., Shenzhen (CN)

(72) Inventors: Jingfei Lv, Wuhan (CN); Yawei Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,758

(22) Filed: Feb. 15, 2022

(65) Prior Publication Data

US 2022/0174113 A1  Jun. 2, 2022

Related U.S. Application Data

(63) Continuation of application No. 16/882,438, filed on May 22, 2020, now Pat. No. 11,272,003, which is a
(Continued)

(51) Int. Cl.
*G06F 15/16* (2006.01)
*H04L 67/1095* (2022.01)
*H04J 3/06* (2006.01)

(52) U.S. Cl.
CPC ........ *H04L 67/1095* (2013.01); *H04J 3/0638* (2013.01)

(58) Field of Classification Search
CPC .................................................. H04L 67/1095
See application file for complete search history.

(56) References Cited

U.S. PATENT DOCUMENTS 6,574,245 B1 *  6/2003  Bedrosian ............. H04J 3/0647
370/503
7,058,729 B1  6/2006  Le Scolan et al.
(Continued)

FOREIGN PATENT DOCUMENTS

CN  101272210 A  9/2008
CN  101641889 A  2/2010
(Continued)

OTHER PUBLICATIONS

Recommendation ITU-T G.8264/Y.1364 (2014) Amendment 2: Distribution of timing information through packet networks Amendment 2,Apr. 2016, total 8 pages.
(Continued)

*Primary Examiner* — Guang W Li
(74) *Attorney, Agent, or Firm* — Maier & Maier, PLLC

(57) ABSTRACT

A network device synchronization method is provided. In various embodiments, a first SSM and a second SSM are received. The first SSM carries a first SSM code indicating a quality level of a first clock source and a first eSSM code indicating the quality level of the first clock source, the second SSM carries a second SSM code indicating a quality level of a second clock source. The second SSM lacks an eSSM code indicating the quality level of the second clock source, and a value of the first SSM code is equal to a value of the second SSM code. When a value of the first eSSM code is less than 0xFF, calibrating a frequency of the network device based on a timing signal of the first clock source.

30 Claims, 5 Drawing Sheets

Related U.S. Application Data continuation of application No. PCT/CN2017/112914, filed on Nov. 24, 2017.

(56) References Cited

U.S. PATENT DOCUMENTS

| | | | |
|---|---|---|---|
| 7,139,264 | B1 | 11/2006 | Slater |
| 7,660,332 | B2 * | 2/2010 | Quijano ............... H04J 3/0688 398/155 |
| 9,112,629 | B2 | 8/2015 | Ruffini et al. |
| 9,654,242 | B2 | 5/2017 | Cao et al. |
| 10,462,760 | B2 * | 10/2019 | Jiang .................... H04J 3/0679 |
| 11,082,141 | B2 * | 8/2021 | Itagaki ................. H04J 3/0638 |
| 2010/0008384 | A1 | 1/2010 | Hamasaki |
| 2010/0020787 | A1 | 1/2010 | Ji et al. |
| 2013/0301657 | A1 | 11/2013 | Barkan |
| 2015/0188691 | A1 | 7/2015 | Mizuguchi |
| 2015/0207580 | A1 | 7/2015 | Li et al. |
| 2015/0280897 | A1 | 10/2015 | Kayama et al. |
| 2016/0182214 | A1 | 6/2016 | Chen |
| 2016/0277137 | A1 | 9/2016 | Robitaille et al. |
| 2017/0222743 | A1 | 8/2017 | Ruffini et al. |
| 2019/0364520 | A1 | 11/2019 | Kazmi et al. |
| 2021/0367693 | A1 * | 11/2021 | S ............................ H04L 7/033 |

FOREIGN PATENT DOCUMENTS

| | | |
|---|---|---|
| CN | 102006158 A | 4/2011 |
| CN | 102130766 A | 7/2011 |
| CN | 102208958 A | 10/2011 |
| CN | 102368696 A | 3/2012 |
| CN | 102714559 A | 10/2012 |
| CN | 103716106 A | 4/2014 |
| CN | 104426645 A | 3/2015 |
| CN | 105471537 A | 4/2016 |
| EP | 2924952 A1 | 9/2015 |

OTHER PUBLICATIONS

"Distribution of timing information through packet networks", ITUT-T G.8264/Y.1364, (Aug. 1, 2017), total 42 pages.

Recommendation ITU-T G.781, Series G: Transmission Systems and Media, Digital Systems and Networks Digital terminal equipments, Principal characteristics of multiplexing equipment for the synchronous digital hierarchy Synchronization layer functions, Sep. 2008, total 124 pages.

ITU-T Recommendation G.8262/Y.1363, Timing Characteristics of synchronous Ethernet equipment slave clock (EEC), Aug. 2007, total 36 pages.

Recommendation ITU-T G.8264/Y.1364, Distribution of timing information through packet networks, May 2014, total 40 pages.

International Telecommunications Union., "Synchronization layer functions", Telecommunications Standardization Sector of ITU, Series G: Transmission Systems and Media, Digital Systems and Networks, Digital terminal Equipments-Principal Characteristics of multiplexing equipment for the synchronous digital hierarchy, Aug. 2017, 136 pages.

* cited by examiner

NETWORK DEVICE SYNCHRONIZATION METHOD AND NETWORK DEVICE

CROSS-REFERENCE TO RELATED APPLICATIONS

This application is a continuation of U.S. patent application Ser. No. 16/882,438 filed on May 22, 2020, which is a continuation of International Application No. PCT/CN2017/112914, filed on Nov. 24, 2017. All of the aforementioned patent applications are hereby incorporated by reference in their entireties.

TECHNICAL FIELD

The present disclosure relates to the field of communications technologies, and in particular, to a network device synchronization method and a network device.

BACKGROUND

A format of a quality level type length value (QL TLV) is defined in the G.8264/Y.1364 (May 2014) released by the International Telecommunication Union-Telecommunication Standardization Sector (ITU-Telecommunication Standardization Sector, ITU-T). A synchronization status message (Synchronization Status Message, SSM) code may be carried in the QL TLV. A format of an extended quality level type length value (extended QL TLV) is defined in the G.8264/Y.1364 Amendment 2 (April 2016) released by the ITU-T. An enhanced synchronization status message (enhanced Synchronization Status Message, eSSM) code may be carried in the extended QL TLV.

A synchronization network includes many devices that support only the old protocol. As a device that supports the new protocol is introduced into the synchronization network, the following case may occur: When receiving both a message indicating that a quality level of a clock source complies with the new protocol and a message indicating that a quality level of another clock source complies with the old protocol, a network device cannot select, from the two clock sources, a clock source with higher clock synchronization accuracy as a synchronization source (synchronization source).

SUMMARY

Various embodiments provide a network device synchronization method, a network device, a computer program product, and a system. In the foregoing solutions, a network device can select a synchronization source with relatively high clock synchronization accuracy.

According to a first aspect, a network device synchronization method is provided. The method includes the following steps:

receiving, by a network device, a first synchronization status message (synchronization status message, SSM) and a second SSM, where the first SSM carries a first SSM code that is used to indicate a quality level of a first clock source and a first enhanced synchronization status message (Enhanced synchronization status message, eSSM) code that is used to indicate the quality level of the first clock source, the second SSM carries a second SSM code that is used to indicate a quality level of a second clock source, the second SSM lacks an eSSM code that is used to indicate the quality level of the second clock source, and a value of the first SSM code is equal to a value of the second SSM code; and when a value of the first eSSM code is less than 0xFF, calibrating, by the network device, a frequency of the network device based on a timing signal of the first clock source.

The value of the first SSM code is equal to the value of the second SSM code. To be specific, if the network device supports only the G.8264/Y.1364, but does not support the G.8264/Y.1364 Amendment 2, the network device determines, based on a fact that the value of the first SSM code is equal to the value of the second SSM code, that the quality level of the first clock source is the same as the quality level of the second clock source.

A set of clock quality levels is defined in the G.8264/Y.1364. For example, the clock quality levels defined in the G.8264/Y.1364 include a QL-PRC, a QL-SSU-A, a QL-SSU-B, a QL-SEC, and a QL-DNU. For the QL-PRC, the QL-SSU-A, the QL-SSU-B, the QL-SEC, and the QL-DNU, refer to the G.781 and the G.8264. A set of clock quality levels is also defined in the G.8264/Y.1364 Amendment 2. Specifically, the clock quality levels defined in the G.8264/Y.1364 Amendment 2 include a QL-PRTC, a QL-ePRTC, a QL-eEEC, and a clock quality level defined in the G.781. When a quality level of a clock source is the clock quality level defined in the G.781, a value of an eSSM code that is used to indicate the quality level of the clock source is equal to 0xFF. When a quality level of a clock source is the QL-PRTC, the QL-ePRTC, or the QL-eEEC, a value of an eSSM code that is used to indicate the quality level of the clock source is less than 0xFF. In addition, a smaller value of the eSSM code correspondingly indicates a higher quality level of the clock source.

The second SSM includes the second SSM code that is used to indicate the quality level of the second clock source, but lacks the eSSM code that is used to indicate the quality level of the second clock source. Therefore, the quality level of the second clock source is a quality level defined in the G.8264/Y.1364. For example, the quality level of the second clock source may be the QL-PRC, the QL-SSU-A, the QL-SSU-B, or a QL-EEC1 defined in the G.8264/Y.1364. According to the G.8264/Y.1364 Amendment 2, a value of an eSSM code corresponding to the QL-PRC, the QL-SSU-A, the QL-SSU-B, or the QL-EEC1 is 0xFF. To be specific, if the network device supports both the G.8264/Y.1364 and the G.8264/Y.1364 Amendment 2, the network device may determine, based on a fact that the second SSM carries the second SSM code that is used to indicate the quality level of the second clock source but does not carry the eSSM code that is used to indicate the quality level of the second clock source, that if the network device needs to generate the eSSM code that is used to indicate the quality level of the second clock source, the value of the eSSM code corresponding to the second clock source is equal to 0xFF.

It may be determined, according to the G.8264/Y.1364 Amendment 2, that when the value of the eSSM code corresponding to the first clock source is less than 0xFF and the value of the eSSM code corresponding to the second clock source is equal to 0xFF, the quality level of the first clock source is higher than the quality level of the second clock source. In this case, compared with tracking the second clock source, when the network device tracks the first clock source, the frequency of the network device is more accurate. Therefore, the network device calibrates the frequency of the network device based on the timing signal of the first clock source instead of calibrating the frequency of the network device based on a timing signal of the second clock source.

In specific implementation, the network device may generate, based on a fact that the second SSM code does not carry the eSSM code that is used to indicate the quality level of the second clock source, the eSSM code corresponding to the second clock source. The value of the eSSM code that is corresponding to the second clock source and that is generated by the network device is equal to 0xFF. The network device may compare the value of the first eSSM code with the value of the generated eSSM code corresponding to the second clock source, to determine that the quality level of the first clock source is higher than the quality level of the second clock source. Certainly, the network device may not generate the eSSM code corresponding to the second clock source. The network device may determine, based on a fact that the value of the first eSSM code is less than 0xFF and the second SSM code does not carry the eSSM code that is used to indicate the quality level of the second clock source, that the quality level of the first clock source is higher than the quality level of the second clock source.

Optionally, in the foregoing technical solution, when the value of the first SSM code is less than the value of the second SSM code, the network device calibrates the frequency of the network device based on the timing signal of the first clock source.

Specifically, if the network device supports the G.8264/Y.1364, but does not support the G.8264/Y.1364 Amendment 2, the network device may determine, based on a fact that the value of the first SSM code is less than the value of the second SSM code, that the quality level of the first clock source is higher than the quality level of the second clock source. The network device calibrates the frequency of the network device based on the timing signal of the first clock source instead of calibrating the frequency of the network device based on a timing signal of the second clock source, so that the frequency of the network device can be more accurate.

Optionally, in the foregoing technical solution, when the value of the first SSM code is greater than the value of the second SSM code, the network device calibrates the frequency of the network device based on a timing signal of the second clock source.

Specifically, if the network device supports the G.8264/Y.1364, but does not support the G.8264/Y.1364 Amendment 2, the network device may determine, based on a fact that the value of the first SSM code is greater than the value of the second SSM code, that the quality level of the first clock source is lower than the quality level of the second clock source. The network device calibrates the frequency of the network device based on the timing signal of the second clock source instead of calibrating the frequency of the network device based on the timing signal of the first clock source, so that the frequency of the network device can be more accurate.

Optionally, in the foregoing technical solution, the method further includes: when the value of the first eSSM code is equal to 0xFF, and a value of a number of cascaded synchronous Ethernet equipment clocks from the nearest synchronization supply unit/primary reference clock (Number of cascaded EECs from the nearest SSU/PRC) in the first SSM is less than 0xFF, calibrating, by the network device, the frequency of the network device based on the timing signal of the first clock source.

Optionally, in the foregoing technical solution, the method further includes: when the value of the first eSSM code is equal to 0xFF, the value of the number of cascaded EECs from the nearest SSU/PRC in the first SSM is equal to 0xFF, and a value of a number of cascaded enhanced synchronous Ethernet equipment clocks from the nearest synchronization supply unit/primary reference clock (Number of cascaded eEECs from the nearest SSU/PRC) in the first SSM is less than 0xFF, calibrating, by the network device, the frequency of the network device based on the timing signal of the first clock source.

Optionally, in the foregoing technical solution, the method further includes: when the value of the first eSSM code is equal to 0xFF, the value of the number of cascaded EECs from the nearest SSU/PRC in the first SSM is equal to 0xFF, the value of the number of cascaded eEECs from the nearest SSU/PRC in the first SSM is equal to 0xFF, and a value of a synchronous Ethernet master identifier (SyncE Master ID) in the first SSM is less than 0xFFFFFFFFFFFFFFFF, calibrating, by the network device, the frequency of the network device based on the timing signal of the first clock source.

Optionally, in the foregoing technical solution, the network device may include a synchronous Ethernet equipment clock or a synchronous optical transport network equipment clock.

According to a second aspect, a network device is provided. The network device includes a receiving unit and a calibration unit.

The receiving unit is configured to receive a first SSM and a second SSM, where the first SSM carries a first SSM code that is used to indicate a quality level of a first clock source and a first eSSM code that is used to indicate the quality level of the first clock source, the second SSM carries a second SSM code that is used to indicate a quality level of a second clock source, the second SSM lacks an eSSM code that is used to indicate the quality level of the second clock source, and a value of the first SSM code is equal to a value of the second SSM code.

The calibration unit is configured to: when a value of the first eSSM code is less than 0xFF, calibrate a frequency of the network device based on a timing signal of the first clock source.

Optionally, in the foregoing technical solution, the calibration unit is further configured to: when the value of the first eSSM code is equal to 0xFF, and a value of a number of cascaded EECs from the nearest SSU/PRC in the first SSM is less than 0xFF, calibrate the frequency of the network device based on the timing signal of the first clock source.

Optionally, in the foregoing technical solution, the calibration unit is further configured to: when the value of the first eSSM code is equal to 0xFF, the value of the number of cascaded EECs from the nearest SSU/PRC in the first SSM is equal to 0xFF, and a value of a number of cascaded eEECs from the nearest SSU/PRC in the first SSM is less than 0xFF, calibrate the frequency of the network device based on the timing signal of the first clock source.

Optionally, in the foregoing technical solution, the calibration unit is further configured to: when the value of the first eSSM code is equal to 0xFF, the value of the number of cascaded EECs from the nearest SSU/PRC in the first SSM is equal to 0xFF, the value of the number of cascaded eEECs from the nearest SSU/PRC in the first SSM is equal to 0xFF, and a value of a SyncE Master ID in the first SSM is less than 0xFFFFFFFFFFFFFFFF, calibrate the frequency of the network device based on the timing signal of the first clock source.

Optionally, in the foregoing technical solution, the network device may include a synchronous Ethernet equipment clock or a synchronous optical transport network equipment clock.

According to a third aspect, a network device is provided. The network device includes a first port, a second port, a processor, and a clock circuit. The first port is coupled to the processor. The second port is coupled to the processor. The clock circuit is coupled to the first port. The clock circuit is coupled to the second port. The network device may perform the method according to the first aspect.

The first port is configured to receive a first SSM, where the first SSM carries a first SSM code that is used to indicate a quality level of a first clock source and a first eSSM code that is used to indicate the quality level of the first clock source.

The second port is configured to receive a second SSM, where the second SSM carries a second SSM code that is used to indicate a quality level of a second clock source, the second SSM lacks an eSSM code that is used to indicate the quality level of the second clock source, and a value of the first SSM code is equal to a value of the second SSM code.

The processor is configured to: when a value of the first eSSM code is less than 0xFF, instruct the first port to provide a timing signal of the first clock source for the clock circuit.

The clock circuit is configured to calibrate a frequency of the network device based on the timing signal of the first clock source.

According to a fourth aspect, a computer program product is provided. The computer program product includes a non-volatile computer readable storage medium. The non-volatile computer readable storage medium stores a computer program. When the computer program is executed by a processor, the processor performs the method according to the first aspect.

According to a fifth aspect, a system is provided. The system includes a first clock source, a second clock source, and the network device according to the second aspect or the third aspect.

DESCRIPTION OF EMBODIMENTS

In accordance with the present disclosure, the G.8264/Y.1364 is a standard released by the ITU-T in May 2014. The G.8264/Y.1364 Amendment 2 is a standard released by the ITU-T in April 2016. The G.781 is a standard released by the ITU-T in September 2008.

The following describes the technical solutions in various embodiments in accordance with the present disclosure with reference to the accompanying drawings in the embodiments of the present disclosure.

Figure 1:
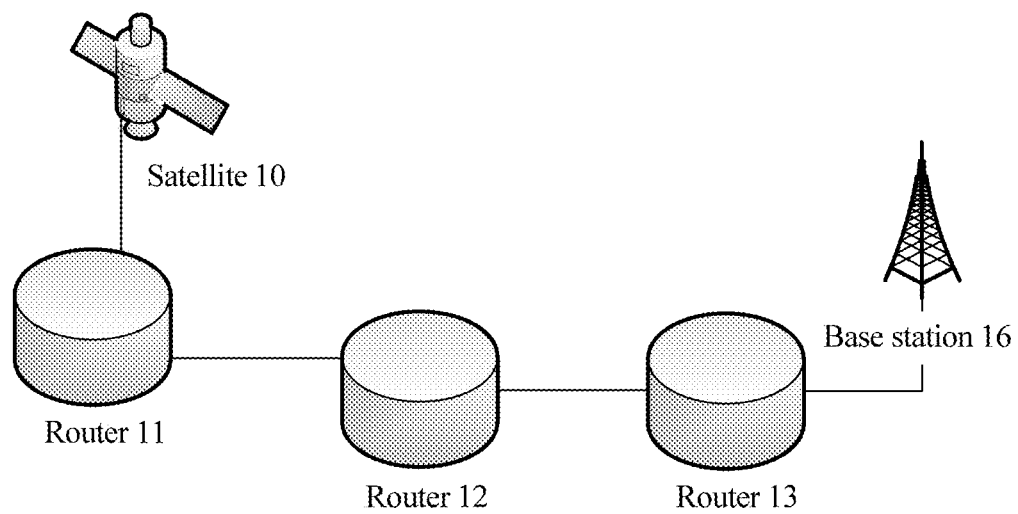
FIG. 1 is a schematic diagram of a synchronization network according to an embodiment.

FIG. 1 is a schematic diagram of a synchronization network according to an embodiment. The clock synchronization network includes a satellite 10, a router 11, a router 12, a router 13, and a base station 16. The satellite 10 may be a GPS satellite. The router 11 may be a provider router.

The router 12 may be a provider edge router. The router 13 may be a customer edge router. The router 11, the router 12, and the router 13 may provide a virtual private network (VPN) service. For example, the VPN service may be a layer 2 virtual private network (L2VPN) service. It may be understood that, when the router 11, the router 12, and the router 13 provide the L2VPN service, another network device, such as a host, that is not shown in FIG. 1 is also involved. The host may be a laptop computer or a desktop computer. A base station 16 is a network device in a cellular network. For example, the base station 16 may be a Node B or an eNodeB. The base station 16 may provide a wireless access service. It may be understood that, when the base station 16 provides the wireless access service, another network device, such as user equipment (UE), that is not shown in FIG. 1 is also involved. The user equipment may be a cellular phone.

The satellite 10 may perform a clock synchronization operation on the router 11. For example, the router 11 may include a building integrated timing supply (BITS) clock. The BITS clock includes a Global Positioning System (GPS) receiver. The satellite 10 may be the GPS satellite. The satellite 10 may include an atomic clock. Driven by the atomic clock, the satellite 10 may send a GPS signal to the router 11. The GPS signal may include time data with same accuracy as that of the atomic clock. After receiving the GPS signal, the GPS receiver in the router 11 may calibrate a clock in the router 11 based on the time data in the GPS signal. After the clock in the router 11 is calibrated, a time of the atomic clock in the GPS satellite and a time of the clock in the router 11 are synchronous. In addition, a frequency of the atomic clock in the GPS satellite and a frequency of the clock in the router 11 are synchronous. In the foregoing process, the BITS clock may be a primary reference time clock (PRTC). After the clock in the router 11 is calibrated, the router 11 may be used as a clock source, and send timing information to another device, to calibrate a time of the another device. In this application, the clock source may also be referred to as a synchronization source. For example, the router 11 may be a clock source that supports the G.8264/Y.1364 Amendment 2. According to the G.8264/Y.1364 Amendment 2, quality levels of the PRTC, an enhanced primary reference time clock (ePRTC), and an enhanced Ethernet equipment clock (Enhanced Ethernet Equipment Clock, eEEC) are respectively a QL-PRTC, a QL-ePRTC, and a QL-eEEC. For example, when a quality level of the BITS clock included in the router 11 is the QL-PRTC, the router 11 may send an SSM to another device. A value of an eSSM code included in the SSM is equal to 0x20. When a quality level of the BITS clock included in the router 11 is the QL-ePRTC, the router 11 may send an SSM to another device. A value of an eSSM code included in the SSM is equal to 0x21. If the another device also supports the G.8264/Y.1364 Amendment 2, the another device may determine, based on the eSSM code in the received SSM, that a quality level of the router 11 is the QL-PRTC or the QL-ePRTC.

After the clock in the router 11 is calibrated, the router 11 may be used as a clock source of another device. Specifically, the router 11 may be used as the clock source to calibrate a clock in the another device. For example, both the router 11 and the router 12 may be devices that support the G.8264/Y.1364 Amendment 2. The router 11 may calibrate a clock in the router 12 according to the G.8264/Y.1364 Amendment 2. Similarly, the router 12 may be used as a clock source to calibrate a clock in the router 13. The router 13 may be used as a clock source to calibrate a clock in a base station 16. In the foregoing process, the router 11 may be considered as a clock source of the router 13. If the router 12 stops tracking the router 11, in other words, when the router 12 is used as a free-running clock (free running clock), the router 12 may be considered as the clock source of the router 13.

In the foregoing solution, the router 11, the router 12, and the router 13 are located in a fixed network. The base station 16 is located in the cellular network. The router 13 may be located on an edge of the fixed network. Before the router 13 calibrates a frequency and a time of the clock in the base station 16, the router 13 needs to synchronize a time of the router 13 with a time of the router 12, and synchronize a frequency of the router 13 with a frequency of the router 12.

Figure 2:
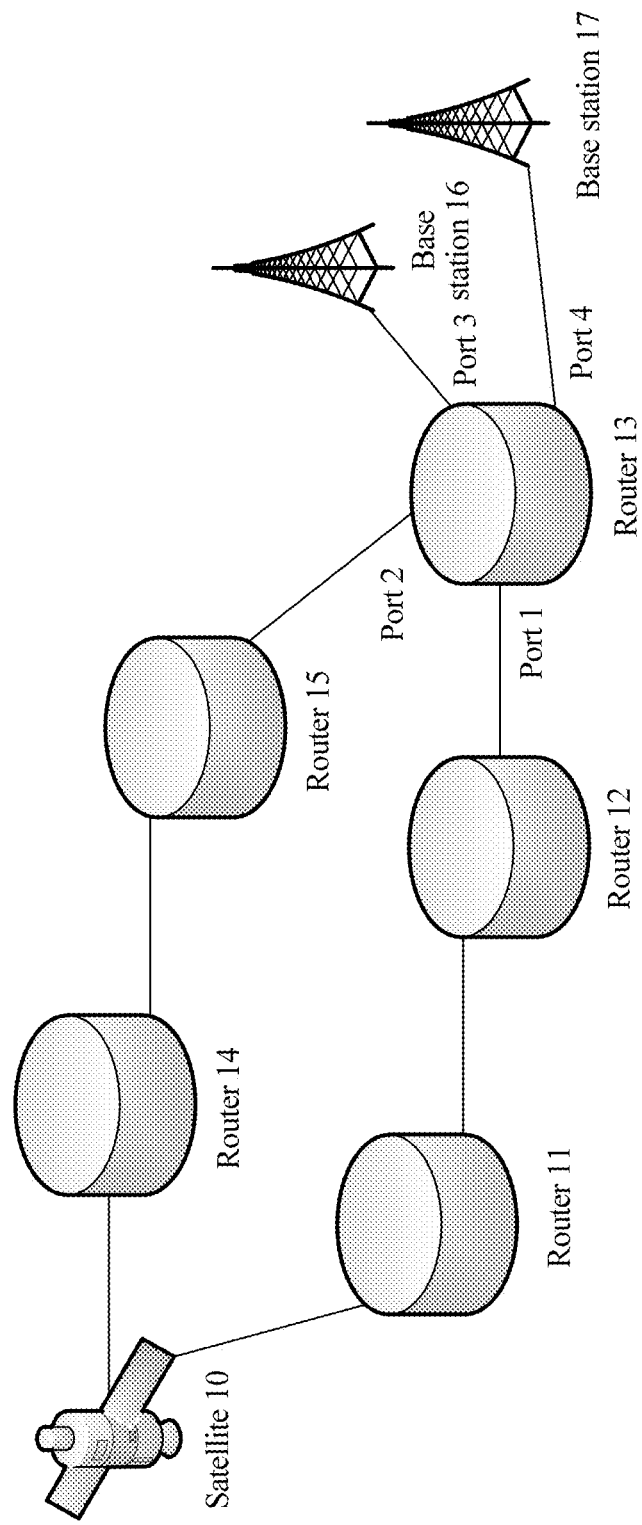
FIG. 2 is a schematic diagram of a synchronization network according to an embodiment.

FIG. 2 is a schematic diagram of a clock synchronization network according to an embodiment. A technical solution shown in FIG. 2 may be obtained by extending the clock synchronization network shown in FIG. 1. For content not mentioned in this embodiment, refer to descriptions in the embodiment corresponding to FIG. 1. The following mainly describes a difference between the technical solution shown in FIG. 2 and a technical solution shown in FIG. 1. The clock synchronization network shown in FIG. 2 includes a satellite 10, a router 11, a router 12, a router 13, a router 14, a router 15, a base station 16, and a base station 17. Compared with FIG. 1, the clock synchronization network shown in FIG. 2 further includes the router 14, the router 15, and the base station 17. The router 14 may be a provider router. The router 15 may be a provider edge router. The base station 17 is a network device in a cellular network.

The satellite 10 may perform a clock synchronization operation on the router 14. For a process of performing the clock synchronization operation on the router 14 by the satellite 10, refer to the foregoing descriptions of the clock synchronization operation performed on the router 11 by the satellite 10. Details are not described herein again. After a clock in the router 14 is calibrated, the router 14 may be used as a clock source to calibrate a time of another device. For example, if the router 14 supports the G.8264/Y.1364, a quality level of the router 14 is a QL-PRC. The router 14 may calibrate a frequency of a clock in the router 15 according to the G.8264/Y.1364. If the router 15 supports the G.8264/Y.1364, but does not support the G.8264/Y.1364 Amendment 2, a quality level of the router 15 is a QL-EEC1 or a QL-EEC2. Therefore, when the router 15 tracks the router 14, a quality level indicated by an SSM code included in an SSM sent by the router 15 to a downstream device (for example, the router 13) is the QL-PRC. When the router 15 is a free-running clock, a quality level indicated by an SSM code included in an SSM sent by the router 15 to a downstream device (for example, the router 13) is the QL-EEC1 or the QL-EEC2.

It can be learned from FIG. 2 that the router 13 is coupled to the router 12, the router 13 is coupled to the router 15, the router 13 is coupled to a base station 16, and the router 13 is coupled to the base station 17. Specifically, the router 13 includes a port 1, a port 2, a port 3, and a port 4. The port 1, the port 2, the port 3, and the port 4 may be Ethernet ports. The Ethernet port may be a fast Ethernet port, a gigabit Ethernet port, or an Ethernet port with a higher rate. The router 13 may be coupled to the router 12 through the port 1. The router 13 may be coupled to the router 15 through the port 2. The router 13 may be coupled to the base station 16 through the port 3. The router 13 may be coupled to the base station 17 through the port 4. The router 13 may respectively receive, through the port 1 and the port 2, information from clock sources: the router 11 and the router 15.

In this embodiment, the router 15 supports the G.8264/Y.1364, but does not support the G.8264/Y.1364 Amendment 2. When the router 15 is the free-running clock, the router 13 receives, through the port 2, an SSM sent by the router 15. An SSM code included in the SSM sent by the router 15 indicates a quality level of the clock source (the router 15). For example, if a value of the SSM code is 0xB, it indicates that the quality level of the router 15 is a QL-EEC1. Because the router 15 does not support the G.8264/Y.1364 Amendment 2, the SSM sent by the router 15 does not include an eSSM code. In other words, the SSM sent by the router 15 does not include the eSSM code that is used to indicate the quality level of the clock source (the router 15).

In this embodiment, the router 12 supports the G.8264/Y.1364 and the G.8264/Y.1364 Amendment 2. When the router 12 tracks the router 11, the router 13 receives, through the port 1, an SSM sent by the router 12. An SSM code included in the SSM sent by the router 12 indicates a quality level of the clock source (the router 11). For example, if a value of the SSM code is 0x2, it indicates that the quality level of the router 11 is a QL-PRC. Because the router 12 supports the G.8264/Y.1364 Amendment 2, the SSM sent by the router 12 includes an eSSM code. The eSSM code included in the SSM sent by the router 12 indicates the quality level of the first clock source (the router 11). For example, if a value of the eSSM code is 0x20, it indicates that the quality level of the router 11 is a QL-PRTC.

Figure 3:
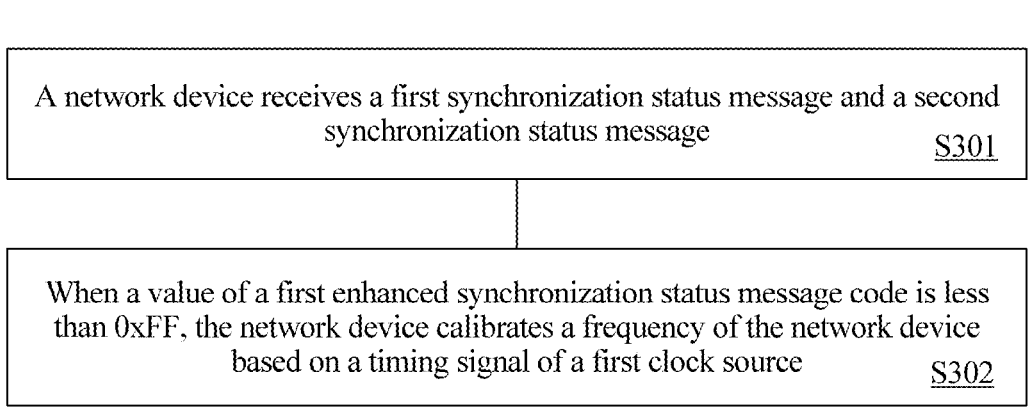
FIG. 3 is a schematic flowchart of a network device synchronization method according to an embodiment.

FIG. 3 is a schematic flowchart of a network device synchronization method according to an embodiment. The method includes S301 and S302. The method shown in FIG. 3 may be performed by a network device. The network device may be a router, a network switch, a firewall, a load balancer, a base station, a packet transport network (PTN) device, a serving GPRS support node (SGSN), a gateway GPRS support node (GGSN), a radio network controller (RNC), or a base station controller (BSC). The network device may include a slave clock. The slave clock may be a synchronous Ethernet equipment slave clock (synchronous Ethernet equipment slave clock). For the synchronous Ethernet equipment slave clock, refer to the Recommendation ITU-T G.8262/Y.1362 (2007). It may be understood that a clock signal-related operation performed by the network device is actually performed by the slave clock. For example, the slave clock may process a received SSM to determine a to-be-tracked clock source. In addition, after determining the to-be-tracked clock source, the slave clock may calibrate a frequency of the slave clock based on timing information from the clock source. The calibrating a frequency of the slave clock may specifically include: A phase-locked loop of the slave clock generates a periodic output signal based on the timing information, where a phase of the periodic output signal is the same as a phase of a periodic input signal included in the timing information. The periodic output signal is an output signal of the phase-locked loop. The periodic input signal is an input signal of the phase-locked loop.

Figure 4:
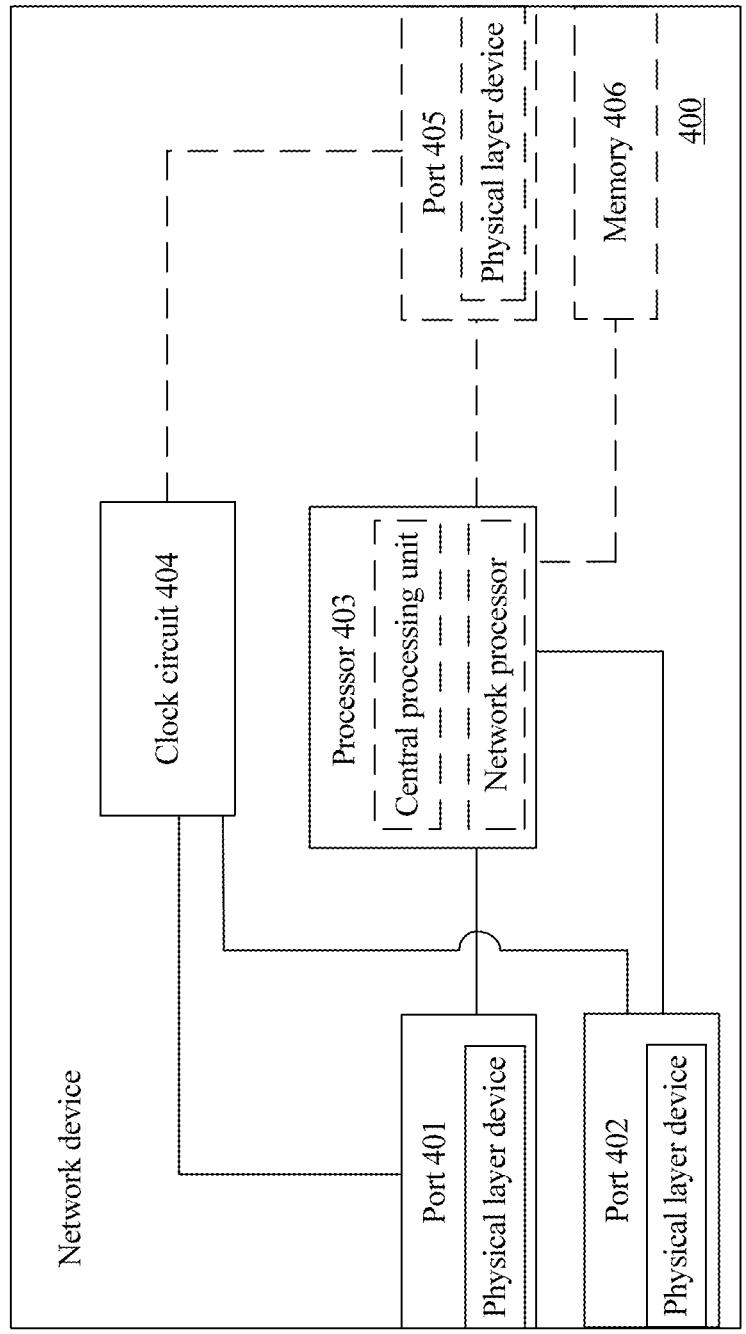
FIG. 4 is a schematic structural diagram of a network device according to an embodiment.

FIG. 4 is a schematic structural diagram of a specific implementation of a network device. Referring to FIG. 4, a network device 400 may include a port 401, a port 402, a processor 403, and a clock circuit 404. The port 401 is coupled to the processor 403. The port 402 is coupled to the processor 403. The port 401 is coupled to the clock circuit 404. The port 402 is coupled to the clock circuit 404. The port 401 includes a physical layer device. The port 402 includes a physical layer device. The processor 403 includes a network processor or a central processing unit. The network processor stores microcode. The network processor may process a received packet by executing the microcode. When the processor 403 includes the central processing unit, the network device 400 may further include a memory 406. The memory 406 is coupled to the central processing unit. The memory 406 stores a computer program. The central processing unit may process a received packet by executing the computer program in the memory 406. In addition, the network device 400 may further include a port 405. The port 405 includes a physical layer device. The processor 403 is coupled to the port 405. When the network device 400 includes the port 405, the clock circuit 404 may be coupled to the port 405. For example, the clock circuit 404 may be a phase-locked loop.

For example, the router 13 shown in FIG. 2 may be specifically the network device shown in FIG. 4. The port 1 of the router 13 may be the port 401. The port 2 of the router 13 may be specifically the port 402. The port 3 of the router 13 may be specifically the port 405.

S301. The network device receives a first SSM and a second SSM.

The first SSM carries a first SSM code that is used to indicate a quality level of a first clock source and a first eSSM code that is used to indicate the quality level of the first clock source. The second SSM carries a second SSM code that is used to indicate a quality level of a second clock source. The second SSM lacks an eSSM code that is used to indicate the quality level of the second clock source. A value of the first SSM code is equal to a value of the second SSM code.

S302. When a value of a first eSSM code is less than 0xFF, the network device calibrates a frequency of the network device based on a timing signal of a first clock source.

For example, the network device may include a synchronous Ethernet equipment slave clock. The network device may respectively receive the first SSM and the second SSM through different ports. A device that sends the first SSM is referred to as a first device, and a device that sends the second SSM is referred to as a second device below. The first device may be a device that supports the G.8264/Y.1364 and the G.8264/Y.1364 Amendment 2. When the first device tracks another device, the first clock source is a device tracked by the first device. When the first device is a free-running clock, the first clock source is the first device. Because the first device supports the G.8264/Y.1364, the first SSM sent by the first device carries the first SSM code. Because the first device supports the G.8264/Y.1364 Amendment 2, the first SSM sent by the first device carries the first eSSM code.

The second device may be a device that supports the G.8264/Y.1364 but does not support the G.8264/Y.1364 Amendment 2. When the second device tracks another device, the second clock source is a device tracked by the second device. When the second device is a free-running clock, the second clock source is the second device. Because the second device supports the G.8264/Y.1364, the second SSM sent by the second device carries the second SSM code. Because the second device does not support the G.8264/Y.1364 Amendment 2, the second SSM sent by the second device does not carry the eSSM code that is used to indicate the quality level of the second clock source.

For example, the network device receives the first SSM and the second SSM through an Ethernet synchronization messaging channel (ESMC). For the ESMC, refer to descriptions of an ESMC in the G.8264/Y.1364.

The first SSM may be an ESMC PDU. For a format of the ESMC PDU, refer to Table 11-3 in the G.8264/Y.1364. The ESMC PDU may include an extended QL TLV and a QL TLV. The QL TLV may include an SSM code. In other words, the first SSM code is carried in the QL TLV. For a format of the QL TLV, refer to Table 11-4 in the G.8264/Y.1364. The extended QL TLV may include an enhanced SSM code (Enhanced SSM code). In other words, the first eSSM code is carried in the extended QL TLV. For a format of the extended QL TLV, refer to Table 11-4.2 in the G.8264/Y.1364 Amendment 2.

The second SSM may be an ESMC PDU. The ESMC PDU may include a QL TLV, but does not include an extended QL TLV. The QL TLV includes the second SSM code.

The value of the first SSM code is equal to the value of the second SSM code. To be specific, if the network device supports only the G.8264/Y.1364, but does not support the G.8264/Y.1364 Amendment 2, the network device determines, based on a fact that the value of the first SSM code is equal to the value of the second SSM code, that the quality level of the first clock source is the same as the quality level of the second clock source.

A set of clock quality levels is defined in the G.8264/Y.1364. For example, the clock quality levels defined in the G.8264/Y.1364 include a QL-PRC, a QL-SSU-A, a QL-SSU-B, a QL-SEC, and a QL-DNU. For the QL-PRC, the QL-SSU-A, the QL-SSU-B, the QL-SEC, and the QL-DNU, refer to the G.781 and the G.8264. A set of clock quality levels is also defined in the G.8264/Y.1364 Amendment 2. Specifically, the clock quality levels defined in the G.8264/Y.1364 Amendment 2 include a QL-PRTC, a QL-ePRTC, a QL-eEEC, and a clock quality level defined in the G.781. When a quality level of a clock source is the clock quality level defined in the G.781, a value of an eSSM code that is used to indicate the quality level of the clock source is equal to 0xFF. When a quality level of a clock source is the QL-PRTC, the QL-ePRTC, or the QL-eEEC, a value of an eSSM code that is used to indicate the quality level of the clock source is less than 0xFF. In addition, a smaller value of the eSSM code correspondingly indicates a higher quality level of the clock source.

The second SSM includes the second SSM code that is used to indicate the quality level of the second clock source, but lacks the eSSM code that is used to indicate the quality level of the second clock source. Therefore, the quality level of the second clock source is a quality level defined in the G.8264/Y.1364. For example, the quality level of the second clock source may be the QL-PRC, the QL-SSU-A, the QL-SSU-B, or a QL-EEC1. According to the G.8264/Y.1364 Amendment 2, a value of an eSSM code corresponding to the QL-PRC, the QL-SSU-A, the QL-SSU-B, or the QL-EEC1 is 0xFF. To be specific, if the network device supports both the G.8264/Y.1364 and the G.8264/Y.1364 Amendment 2, the network device may determine, based on a fact that the second SSM carries the second SSM code that is used to indicate the quality level of the second clock source but does not carry the eSSM code that is used to indicate the quality level of the second clock source, that the value of the eSSM code corresponding to the second clock source is equal to 0xFF.

It may be determined, according to the G.8264/Y.1364 Amendment 2, that when the value of the eSSM code corresponding to the first clock source is less than 0xFF and the value of the eSSM code corresponding to the second clock source is equal to 0xFF, the quality level of the first clock source is higher than the quality level of the second clock source. In this case, compared with tracking the second clock source, when the network device tracks the first clock source, the frequency of the network device is more accurate. Therefore, the network device calibrates the frequency of the network device based on the timing signal of the first clock source instead of calibrating the frequency of the network device based on a timing signal of the second clock source.

In one example implementation of S302, the network device may generate, based on a fact that the second SSM code does not carry the eSSM code that is used to indicate the quality level of the second clock source, the eSSM code corresponding to the second clock source. The value of the eSSM code corresponding to the second clock source and generated by the network device is equal to 0xFF. The network device may compare the value of the first eSSM code with the value of the generated eSSM code corresponding to the second clock source, to determine that the quality level of the first clock source is higher than the quality level of the second clock source. Certainly, in specific implementation of S302, the network device may not generate the eSSM code corresponding to the second clock source. The network device may determine, based on a fact that the value of the first eSSM code is less than 0xFF and the second SSM code does not carry the eSSM code that is used to indicate the quality level of the second clock source, that the quality level of the first clock source is higher than the quality level of the second clock source.

In one example implementation, when the value of the first SSM code is less than the value of the second SSM code, the network device calibrates the frequency of the network device based on the timing signal of the first clock source.

For example, if the network device supports the G.8264/Y.1364, but does not support the G.8264/Y.1364 Amendment 2, the network device may determine, based on a fact that the value of the first SSM code is less than the value of the second SSM code, that the quality level of the first clock source is higher than the quality level of the second clock source. The network device calibrates the frequency of the network device based on the timing signal of the first clock source instead of calibrating the frequency of the network device based on a timing signal of the second clock source, so that the frequency of the network device can be more accurate.

In one implementation, when the value of the first SSM code is greater than the value of the second SSM code, the network device calibrates the frequency of the network device based on a timing signal of the second clock source.

In some embodiments, if the network device supports the G.8264/Y.1364, but does not support the G.8264/Y.1364 Amendment 2, the network device may determine, based on a fact that the value of the first SSM code is greater than the value of the second SSM code, that the quality level of the first clock source is lower than the quality level of the second clock source. The network device calibrates the frequency of the network device based on the timing signal of the second clock source instead of calibrating the frequency of the network device based on the timing signal of the first clock source, so that the frequency of the network device can be more accurate.

In one example implementation, when the value of the first eSSM code is equal to 0xFF, and a value of a number of cascaded synchronous Ethernet equipment clocks from the nearest synchronization supply unit/primary reference clock in the first SSM is less than 0xFF, the network device calibrates the frequency of the network device based on the timing signal of the first clock source.

In one example implementation, when the value of the first eSSM code is equal to 0xFF, the value of the number of cascaded synchronous Ethernet equipment clocks from the nearest synchronization supply unit/primary reference clock in the first SSM is equal to 0xFF, and a value of a number of cascaded enhanced synchronous Ethernet equipment clocks from the nearest synchronization supply unit/primary reference clock in the first SSM is less than 0xFF, the network device calibrates the frequency of the network device based on the timing signal of the first clock source.

In one example implementation, when the value of the first eSSM code is equal to 0xFF, the value of the number of cascaded synchronous Ethernet equipment clocks from the nearest synchronization supply unit/primary reference clock in the first SSM is equal to 0xFF, the value of the number of cascaded enhanced synchronous Ethernet equipment clocks from the nearest synchronization supply unit/primary reference clock in the first SSM is equal to 0xFF, and a value of a SyncE Master ID in the first SSM is less than 0xFFFFFFFFFFFFFFFF, the network device calibrates the frequency of the network device based on the timing signal of the first clock source.

In one example implementation, the network device may be an Ethernet device. When the network device is the Ethernet device, the network device includes a synchronous Ethernet equipment clock.

In one example implementation, the network device may be an optical network device. When the network device is the optical network device, the network device includes a synchronous optical transport network equipment clock.

With reference to FIG. 2 and FIG. 4, the following uses an example to describe the method shown in FIG. 3.

The network device in the method shown in FIG. 3 may be the network device 400.

The network device 400 shown in FIG. 4 may be the router 13 in FIG. 2. The first clock source is the router 12. The second clock source is the router 15. The port 1 and the port 2 are respectively the port 401 and the port 402. The first SSM may be an ESMC PDU sent by the router 12 that is received by the router 13 through the port 401. The second SSM may be an ESMC PDU sent by the router 15 that is received by the router 13 through the port 402. The router 15 supports the G.8264/Y.1364, but does not support the G.8264/Y.1364 Amendment 2. When the router 15 is a free-running clock, an SSM code included in the ESMC PDU sent by the router 15 indicates a quality level of the second clock source (the router 15). For example, if a value of the SSM code is 0xB, the quality level of the router 15 is a QL-EEC1. Because the router 15 does not support the G.8264/Y.1364 Amendment 2, the SSM sent by the router 15 does not include an eSSM code. The router 12 supports the G.8264/Y.1364 and the G.8264/Y.1364 Amendment 2. When the router 12 does not track the router 11, the router 12 is a free-running clock. An SSM code included in the ESMC PDU sent by the router 12 indicates a quality level of the first clock source (the router 12). If a value of the SSM code is 0xB, it indicates that the quality level of the router 12 is a QL-EEC1. Because the router 12 supports the G.8264/Y.1364 Amendment 2, the ESMC PDU sent by the router 12 includes an eSSM code. The eSSM code indicates the quality level of the first clock source (the router 12). If a value of the eSSM code is 0x22, it indicates that the quality level of the router 12 is a QL-eEEC.

After the port 401 receives the ESMC PDU sent by the router 12, the processor 403 may determine, by parsing the ESMC PDU, that quality level information carried in the ESMC PDU is quality level information of the router 12. The processor 403 may determine that the port 401 is a port configured to receive timing information sent by the router 12.

After the port 402 receives the ESMC PDU sent by the router 15, the processor 403 may determine, by parsing the ESMC PDU, that quality level information carried in the ESMC PDU is quality level information of the router 15. The processor 403 may determine that the port 402 is a port configured to receive timing information sent by the router 15.

When the network device 400 includes the memory 406, the memory 406 stores a computer program that is used to execute the G.8264/Y.1364 and the G.8264/Y.1364 Amendment 2. The central processing unit may perform the following operations by executing the computer program. The central processing unit parses the ESMC PDU sent by the router 12 and the ESMC PDU sent by the router 15, to obtain the SSM code and the eSSM code that are used to indicate the quality level of the router 12, and obtain the SSM code that is used to indicate the quality level of the router 15; and the central processing unit compares the value of the SSM code that is used to indicate the quality level of the router 12 with the value of the SSM code that is used to indicate the quality level of the router 15, to determine that the value of the SSM code that is used to indicate the quality level of the router 12 is equal to the value of the SSM code that is used to indicate the quality level of the router 15, determine that the value of the eSSM code that is used to indicate the quality level of the router 12 is less than 0xFF, and determine that the quality level of the router 12 is higher than the quality level of the router 15. The processor 403 may instruct the port 401 to send the timing information received by the port 401 to the clock circuit 404. For example, the central processing unit performs configuration on the port 401, so that the port 401 sends the received timing information to the phase-locked loop.

In one example implementation, the first clock source is the router 11. The second clock source is the router 14. The first SSM may be an ESMC PDU sent by the router 12 that is received by the router 13 through the port 401. The second SSM may be an ESMC PDU sent by the router 15 that is received by the router 13 through the port 402. The router 15 supports the G.8264/Y.1364, but does not support the G.8264/Y.1364 Amendment 2. When the router 15 tracks a time and a frequency of the router 14, an SSM code included in the ESMC PDU sent by the router 15 indicates a quality level of the second clock source (the router 14). For example, if a value of the SSM code is 0x2, the quality level of the router 14 is a QL-PRC. Because the router 15 does not support the G.8264/Y.1364 Amendment 2, the SSM sent by the router 15 does not include an eSSM code. The router 12 supports the G.8264/Y.1364 and the G.8264/Y.1364 Amendment 2. When the router 12 tracks a time and a frequency of the router 11, an SSM code included in the ESMC PDU sent by the router 12 indicates a quality level of the first clock source (the router 11). If a value of the SSM code is 0x2, it indicates that the quality level of the router 11 is a QL-PRC, a QL-PRTC, or a QL-ePRTC. Because the router 12 supports the G.8264/Y.1364 Amendment 2, the ESMC PDU sent by the router 12 includes an eSSM code. The eSSM code indicates the quality level of the first clock source (the router 11). If a value of the eSSM code is 0x20, it indicates that the quality level of the router 11 is a QL-PRTC.

After the port 401 receives the ESMC PDU sent by the router 12, the processor 403 may determine, by parsing the ESMC PDU, that quality level information carried in the ESMC PDU is quality level information of the router 11. Then, the processor 403 may determine that the port 401 is a port configured to receive timing information sent by the router 11.

After the port 402 receives the ESMC PDU sent by the router 15, the processor 403 may determine, by parsing the ESMC PDU, that quality level information carried in the ESMC PDU is quality level information of the router 14. Then, the processor 403 may determine that the port 402 is a port configured to receive timing information sent by the router 14.

When the network device 400 includes the memory 406, the memory 406 stores a computer program that is used to execute the G.8264/Y.1364 and the G.8264/Y.1364 Amendment 2. The central processing unit may perform the following operations by executing the computer program. The central processing unit parses the ESMC PDU sent by the router 12 and the ESMC PDU sent by the router 15, to obtain the SSM code and the eSSM code that are used to indicate the quality level of the router 11, and obtain the SSM code that is used to indicate the quality level of the router 14; and the central processing unit compares the value of the SSM code that is used to indicate the quality level of the router 11 with the value of the SSM code that is used to indicate the quality level of the router 14, to determine that the value of the SSM code that is used to indicate the quality level of the router 11 is equal to the value of the SSM code that is used to indicate the quality level of the router 14, determine that the value of the eSSM code that is used to indicate the quality level of the router 11 is less than 0xFF, and determine that the quality level of the router 11 is higher than the quality level of the router 14. The processor 403 may instruct the port 401 to send the timing information received by the port 401 to the clock circuit 404. For example, the central processing unit performs configuration on the port 401, so that the port 401 sends the received timing information to the phase-locked loop.

In this embodiment, the port 401 includes a physical layer device. The physical layer device includes a circuit configured to perform clock recovery (clock recovery). After the port 401 receives a data flow from the router 12, the circuit that performs clock recovery can obtain timing information from the data flow. For example, the timing information may be a physical timing flow. For the physical timing flow, refer to descriptions in the G.8264/Y.1364. The timing information is a periodic signal. Because the periodic signal is to be input to the phase-locked loop, the periodic signal is referred to as a periodic input signal herein. The port 401 sends the timing information to the clock circuit 404. For example, the port 401 sends the timing information to the phase-locked loop. The phase-locked loop generates a periodic output signal based on the timing information, and a phase of the periodic output signal is the same as a phase of the periodic input signal included in the timing information. The phase-locked loop may send the periodic output signal to the port 405. For example, the periodic output signal may be T0. For T0, refer to descriptions of T0 in FIG. A.2 in the G.8264/Y.1364. The periodic output signal may be a reference clock signal of the port 405. Specifically, a physical layer device in the port 405 processes, based on the reference clock signal, an Ethernet frame provided by the network processor. For example, the physical layer device in the port 405 may perform processing such as physical layer encoding, scrambling, virtual channel distribution, and alignment marker insertion. After processing the Ethernet frame, the physical layer device in the port 405 may send a data flow to the base station 16.

Figure 5:
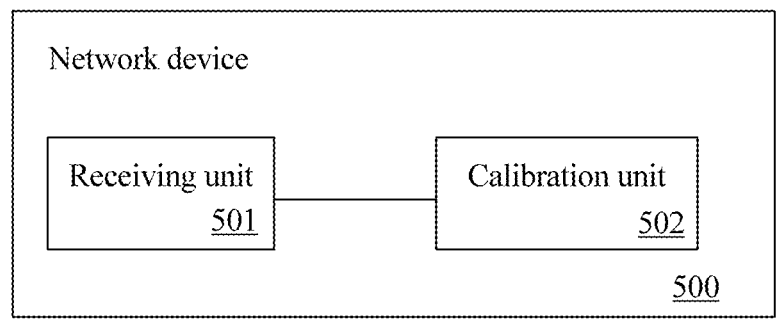
FIG. 5 is a schematic structural diagram of a network device according to an embodiment.

FIG. 5 is a schematic structural diagram of a network device 500 according to an embodiment of the present disclosure. Referring to FIG. 5, the network device 500 includes a receiving unit 501 and a calibration unit 502. For example, the network device 500 may be specifically the network device shown in FIG. 4. For an example implementation of the network device 500, refer to descriptions in the embodiment corresponding to FIG. 4. The network device 500 may perform the method shown in FIG. 3. For a specific implementation of the network device 500, refer to descriptions in the embodiment corresponding to FIG. 3.

The receiving unit 501 is configured to receive a first SSM and a second SSM.

The first SSM carries a first SSM code that is used to indicate a quality level of a first clock source and a first eSSM code that is used to indicate the quality level of the first clock source, the second SSM carries a second SSM code that is used to indicate a quality level of a second clock source, the second SSM lacks an eSSM code that is used to indicate the quality level of the second clock source, and a value of the first SSM code is equal to a value of the second SSM code.

For example, the receiving unit 501 may be configured to perform S301. For a specific implementation of the receiving unit 501, refer to descriptions of S301 in the embodiment shown in FIG. 3.

For example, the receiving unit 501 may specifically include the port 401 and the port 402 in FIG. 4. For example, the network device 500 may be the router 13 in FIG. 2. The router 13 may receive, through the port 1, the first SSM sent by the router 12, and receive, through the port 2, the second SSM sent by the router 15.

The calibration unit 502 is configured to: when a value of the first eSSM code is less than 0xFF, calibrate a frequency of the network device based on a timing signal of the first clock source.

For example, the calibration unit 502 may be configured to perform S302. For a specific implementation of the calibration unit 502, refer to descriptions of S302 in the embodiment shown in FIG. 3.

For example, the calibration unit 502 may include the clock circuit 404 in FIG. 4. In this embodiment, the calibration unit 502 may include a phase-locked loop. The phase-locked loop may receive the timing signal of the first clock source through the port 401. The calibrating a frequency of the network device based on a timing signal of the first clock source may be specifically: generating a system clock signal based on the timing signal of the first clock source. A frequency of the system clock signal is equal to a frequency of the timing signal of the first clock source. The system clock signal may be used to drive a component in the network device. For example, the component in the network device may be an interface board or a physical layer device. An operation of determining that the value of the first eSSM code is less than 0xFF may be performed by the processor 403 in FIG. 4. For example, the central processing unit determines, by executing the computer program stored in the memory 406, that the value of the first eSSM code is less than 0xFF. Alternatively, the network processor determines, by executing the microcode stored in the network processor, that the value of the first eSSM code is less than 0xFF.

In some embodiments, the calibration unit 502 is further configured to: when the value of the first eSSM code is equal to 0xFF, and a value of a number of cascaded EECs from the nearest SSU/PRC in the first SSM is less than 0xFF, calibrate the frequency of the network device based on the timing signal of the first clock source.

In some embodiments, the calibration unit 502 is further configured to: when the value of the first eSSM code is equal to 0xFF, the value of the number of cascaded EECs from the nearest SSU/PRC in the first SSM is equal to 0xFF, and a value of a number of cascaded eEECs from the nearest SSU/PRC in the first SSM is less than 0xFF, calibrate the frequency of the network device based on the timing signal of the first clock source.

In some embodiments, the calibration unit 502 is further configured to: when the value of the first eSSM code is equal to 0xFF, the value of the number of cascaded EECs from the nearest SSU/PRC in the first SSM is equal to 0xFF, the value of the number of cascaded eEECs from the nearest SSU/PRC in the first SSM is equal to 0xFF, and a value of a SyncE Master ID in the first SSM is less than 0xFFFFFFFFFFFFFFFF, calibrate the frequency of the network device based on the timing signal of the first clock source.

In some embodiments, the network device 500 is a synchronous Ethernet equipment clock or a synchronous optical transport network equipment clock.

Figure 6:
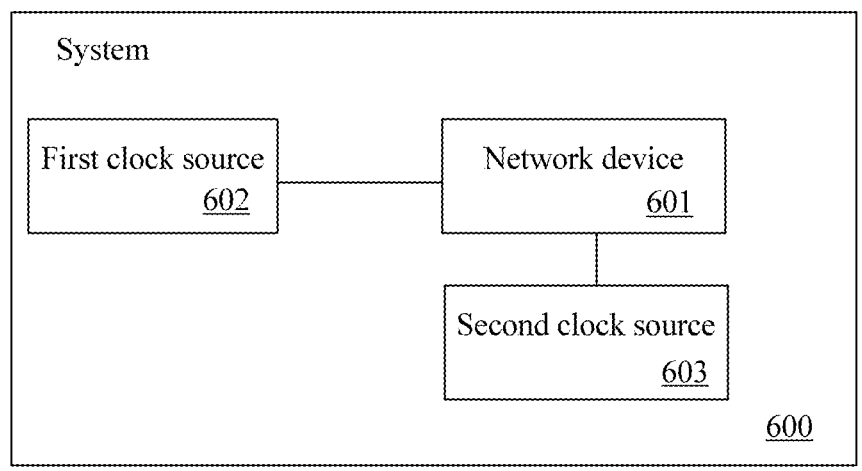
FIG. 6 is a schematic structural diagram of a system according to an embodiment.

FIG. 6 is a schematic structural diagram of a system according to an embodiment of the present disclosure. Referring to FIG. 6, the system 600 includes a network device 601, a first clock source 602, and a second clock source 603. The network device 601 may be the network device 500 shown in FIG. 5 or the network device 400 shown in FIG. 4. The network device 601 may perform the method shown in FIG. 3. For a specific implementation of the network device 601, refer to descriptions in the embodiments corresponding to FIG. 3, FIG. 4, and FIG. 5. Details are not described herein.

In addition, the system 600 shown in FIG. 6 may be applied to the network shown in FIG. 2. For example, the first clock source 602 may be the router 11. The second clock source 603 may be the router 15. The network device 601 may be the router 13. The router 11 is a clock source of the router 12. The router 12 tracks a frequency of the router 11. The router 15 does not track the router 14. The router 15 is a free-running clock. For a specific implementation in which the system 600 shown in FIG. 6 is applied to the network shown in FIG. 2, refer to descriptions in the embodiment corresponding to FIG. 2.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units or steps may be implemented by electronic hardware or a combination of computer software and electronic hardware. Whether the functions are performed by hardware or a combination of software and hardware depends on particular applications and design constraint conditions of the technical solutions. A person skilled in the art may use different methods to implement the described functions for each particular application, but it should not be considered that the implementation goes beyond the scope of the claims.

It may be understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

The technical solutions in accordance with the disclosure or a part of the technical solutions may be implemented in a form of a software product. The computer software product is stored in a storage medium, and includes several instructions for instructing a processor or a computer device (which may be a personal computer, a server, a network device, or the like) to perform all or some of the steps of the methods described in the embodiments of this application. The foregoing storage medium includes any medium that can store program code, such as a universal serial bus flash drive, a removable hard disk, a read-only memory (ROM), a random access memory (RAM), a magnetic disk, or an optical disc.

What is claimed is:

1. A network device synchronization method, comprising:
   receiving, by the network device, a first synchronization status message (SSM) and a second SSM, wherein
      the first SSM carries a first SSM code and a first enhanced synchronization status message (eSSM) code to indicate a quality level of the first clock source, and
      the second SSM carries a second SSM code without a second eSSM code to indicate a quality level of the second clock source; and
   determining, by the network device, according to the first SSM code and the first eSSM code in the first SSM and the second SSM code in the second SSM, a clock source of the network device.

2. The method according to claim 1, wherein the determining, by the network device, according to the first SSM code and the first eSSM code in the first SSM and the second SSM code in the second SSM, a clock source of the network device, comprises:
   when a value of the first SSM code is less than a value of the second SSM code, determining, by the network device, that the first clock source is the clock source of the network device.

3. The method according to claim 1, before the determining, by the network device, according to the first SSM code and the first eSSM code in the first SSM and the second SSM code in the second SSM, a clock source of the network device, further comprises:
   determining, by the network device, that a value of the second eSSM code is 0xFF.

4. The method according to claim 3, wherein the clock source of the network device is determined further according to the second eSSM code.

5. The method according to claim 1, wherein the determining, by the network device, according to the first SSM code and the first eSSM code in the first SSM and the second SSM code in the second SSM, a clock source of the network device, comprises:
   when a value of the first SSM code is equal to a value of the second SSM code, and a value of the first eSSM code is less than 0xFF, determining, by the network device, that the first clock source is a clock source of the network device.

6. The method according to claim 1, wherein the determining, by the network device, according to the first SSM code and the first eSSM code in the first SSM and the second SSM code in the second SSM, a clock source of the network device, comprises:
   when a value of the first SSM code is equal to a value of the second SSM code, and a value of the first eSSM code is equal to 0xFF, and a value of a number of cascaded synchronous Ethernet equipment clocks from the nearest synchronization supply unit/primary reference clock in the first SSM is less than 0xFF, determining, by the network device, that the first clock source is a clock source of the network device.

7. The method according to claim 1, wherein the determining, by the network device, according to the first SSM code and the first eSSM code in the first SSM and the second SSM code in the second SSM, a clock source of the network device, comprises:
   when a value of the first SSM code is equal to a value of the second SSM code, and a value of the first eSSM code is equal to 0xFF, a value of the number of cascaded synchronous Ethernet equipment clocks from the nearest synchronization supply unit/primary reference clock in the first SSM is equal to 0xFF, and a value of a number of cascaded enhanced synchronous Ethernet equipment clocks from the nearest synchronization supply unit/primary reference clock in the first SSM is less than 0xFF, determining, by the network device, that the first clock source is a clock source of the network device.

8. The method according to claim 1, wherein the determining, by the network device, according to the first SSM code and the first eSSM code in the first SSM and the second SSM code in the second SSM, a clock source of the network device, comprises:
   when a value of the first SSM code is equal to a value of the second SSM code, and a value of the first eSSM code is equal to 0xFF, a value of the number of cascaded synchronous Ethernet equipment clocks from the nearest synchronization supply unit/primary reference clock in the first SSM is equal to 0xFF, a value of the number of cascaded enhanced synchronous Ethernet equipment clocks from the nearest synchronization supply unit/primary reference clock in the first SSM is equal to 0xFF, and a value of a synchronous Ethernet master identifier (SyncE Master ID) in the first SSM is less than 0xFFFFFFFFFFFFFFFF, determining, by the network device, that the first clock source is a clock source of the network device.

9. The method according to claim 1, wherein the determining, by the network device, according to the first SSM code and the first eSSM code in the first SSM and the second SSM code in the second SSM, a clock source of the network device, comprises:

determining, by the network device, a quality level of the first clock source and a quality level of the second clock source according to the first SSM code and the first eSSM code in the first SSM and the second SSM code in the second SSM; and;

determining, by the network device, the clock source of the network device according to the quality level of the first clock source and the quality level of the second clock source.

10. The method according to claim 9, wherein the determining, by the network device, the clock source of the network device according to the quality level of the first clock source and the quality level of the second clock source comprises:

determining, by the network device, that the quality level of the first clock source is higher than the quality level of the second clock source.

11. A network device, comprising:

a non-transitory memory storing instructions; and a processor coupled to the non-transitory memory; wherein the instructions, when executed by the processor, cause the network device to be configured to:

receive a first synchronization status message (SSM) and a second SSM, wherein the first SSM carries a first SSM code and a first enhanced synchronization status message (eSSM) code to indicate a quality level of the first clock source, and the second SSM carries a second SSM code without a second eSSM code to indicate a quality level of the second clock source; and determine, by the network device, according to the first SSM code and the first eSSM code in the first SSM and the second SSM code in the second SSM, a clock source of the network device.

12. The device according to claim 11, wherein the instructions, when executed by the processor, further cause the network device to be configured to:

when a value of the first SSM code is less than a value of the second SSM code, determine that the first clock source is the clock source of the network device.

13. The device according to claim 11, wherein the instructions, when executed by the processor, further cause the network device to be configured to:

determine that a value of the second eSSM code is 0xFF.

14. The device according to claim 13, wherein the clock source of the network device is determined further according to the second eSSM code.

15. The device according to claim 11, wherein the instructions, when executed by the processor, further cause the network device to be configured to:

when a value of the first SSM code is equal to a value of the second SSM code, and a value of the first eSSM code is less than 0xFF, determine that the first clock source is a clock source of the network device.

16. The device according to claim 11, wherein the instructions, when executed by the processor, further cause the network device to be configured to:

when a value of the first SSM code is equal to a value of the second SSM code, and a value of the first eSSM code is equal to 0xFF, and a value of a number of cascaded synchronous Ethernet equipment clocks from the nearest synchronization supply unit/primary reference clock in the first SSM is less than 0xFF, determine that the first clock source is a clock source of the network device.

17. The device according to claim 11, wherein the instructions, when executed by the processor, further cause the network device to be configured to:

when a value of the first SSM code is equal to a value of the second SSM code, and a value of the first eSSM code is equal to 0xFF, a value of the number of cascaded synchronous Ethernet equipment clocks from the nearest synchronization supply unit/primary reference clock in the first SSM is equal to 0xFF, and a value of a number of cascaded enhanced synchronous Ethernet equipment clocks from the nearest synchronization supply unit/primary reference clock in the first SSM is less than 0xFF, determine that the first clock source is a clock source of the network device.

18. The device according to claim 11, wherein the instructions, when executed by the processor, further cause the network device to be configured to:

when a value of the first SSM code is equal to a value of the second SSM code, and a value of the first eSSM code is equal to 0xFF, a value of the number of cascaded synchronous Ethernet equipment clocks from the nearest synchronization supply unit/primary reference clock in the first SSM is equal to 0xFF, a value of the number of cascaded enhanced synchronous Ethernet equipment clocks from the nearest synchronization supply unit/primary reference clock in the first SSM is equal to 0xFF, and a value of a synchronous Ethernet master identifier (SyncE Master ID) in the first SSM is less than 0xFFFFFFFFFFFFFFFF, determine that the first clock source is a clock source of the network device.

19. The device according to claim 11, wherein the instructions, when executed by the processor, further cause the network device to be configured to:

determine a quality level of the first clock source and a quality level of the second clock source according to the first SSM code and the first eSSM code in the first SSM and the second SSM code in the second SSM; and;

determine the clock source of the network device according to the quality level of the first clock source and the quality level of the second clock source.

20. The device according to claim 19, wherein the instructions, when executed by the processor, further cause the network device to be configured to:

determine that the quality level of the first clock source is higher than the quality level of the second clock source.

21. A computer program product comprising a non-transitory computer readable medium storing program code thereon for network device synchronization, the program code comprising instructions for executing a method that comprises:

receiving a first synchronization status message (SSM) and a second SSM, wherein the first SSM carries a first SSM code and a first enhanced synchronization status message (eSSM) code to indicate a quality level of the first clock source, and the second SSM carries a second SSM code without a second eSSM code to indicate a quality level of the second clock source; and determining according to the first SSM code and the first eSSM code in the first SSM and the second SSM code in the second SSM, a clock source of the network device.

22. The computer program product according to claim 21, further comprising:

when a value of the first SSM code is less than a value of the second SSM code, determining that the first clock source is the clock source of the network device.

23. The computer program product according to claim 21, further comprising:
determining, by the network device, that a value of the second eSSM code is 0xFF.

24. The computer program product according to claim 23, wherein the clock source of the network device is determined further according to the second eSSM code.

25. The computer program product according to claim 21, further comprising:
when a value of the first SSM code is equal to a value of the second SSM code, and a value of the first eSSM code is less than 0xFF, determining that the first clock source is a clock source of the network device.

26. The computer program product according to claim 21, further comprising:
determining a quality level of the first clock source and a quality level of the second clock source according to the first SSM code and the first eSSM code in the first SSM and the second SSM code in the second SSM; and;
determining the clock source of the network device according to the quality level of the first clock source and the quality level of the second clock source.

27. The computer program product according to claim 26, further comprising:
determining that the quality level of the first clock source is higher than the quality level of the second clock source.

28. A network device synchronization method, comprising:
receiving, by the network device, a first synchronization status message (SSM) and a second SSM, wherein the first SSM carries a first SSM code and a first enhanced synchronization status message (eSSM) code, and the second SSM carries a second SSM code, wherein the first SSM code and the first eSSM code is used to determine a quality level of the first clock source, and the second SSM is used to determine a quality level of the second clock source; and
determining, by the network device, according to the quality level of the first clock source and the quality level of the first clock source, a clock source of the network device.

29. The method according to claim 28, further comprises:
determining, by the network device, that a value of a second eSSM code is 0xFF, wherein the quality level of the second clock source is determined further according to the second eSSM code.

30. A network device, comprising:
a non-transitory memory storing instructions; and
a processor coupled to the non-transitory memory; wherein the instructions, when executed by the processor, cause the network device to be configured to:
receive a first synchronization status message (SSM) and a second SSM, wherein the first SSM carries a first SSM code and a first enhanced synchronization status message (eSSM) code, and the second SSM carries a second SSM code, wherein the first SSM code and the first eSSM code is used to determine a quality level of the first clock source, and the second SSM is used to determine a quality level of the second clock source; and
determine, according to the quality level of the first clock source and the quality level of the first clock source, a clock source of the network device.

\* \* \* \* \*